(12) United States Patent
Wang et al.

(10) Patent No.: US 9,176,929 B2
(45) Date of Patent: Nov. 3, 2015

(54) MULTI-GRANULARITY PARALLEL FFT COMPUTATION DEVICE

(75) Inventors: Donglin Wang, Beijing (CN); Shaolin Xie, Beijing (CN); Jie Hao, Beijing (CN); Xiao Lin, Beijing (CN); Tao Wang, Beijing (CN); Leizu Yin, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 218 days.

(21) Appl. No.: 14/118,611

(22) PCT Filed: Dec. 31, 2011

(86) PCT No.: PCT/CN2011/085179
§ 371 (c)(1),
(2), (4) Date: Nov. 19, 2013

(87) PCT Pub. No.: WO2013/097236
PCT Pub. Date: Jul. 4, 2013

(65) Prior Publication Data
US 2014/0089369 A1    Mar. 27, 2014

(51) Int. Cl.
*G06F 17/14* (2006.01)
(52) U.S. Cl.
CPC .................................... *G06F 17/142* (2013.01)
(58) Field of Classification Search
CPC ....................................................... G06F 17/142
USPC .................................................. 708/404, 409
See application file for complete search history.

(56) References Cited

U.S. PATENT DOCUMENTS

| 6,304,887 | B1 | 10/2001 | Ju et al. |
| 7,062,523 | B1 * | 6/2006 | Hoffman et al. ............... 708/404 |
| 2006/0109891 | A1 | 5/2006 | Guo et al. |
| 2013/0046806 | A1 * | 2/2013 | Hashimoto ................... 708/404 |

FOREIGN PATENT DOCUMENTS

| CN | 101231632 A | 7/2008 |
| CN | 101339546 A | 1/2009 |
| CN | 102411557 A | 4/2012 |

OTHER PUBLICATIONS

International Search Report issued in PCT/CN2011/085179 mailed on Nov. 1, 2012 (2 pages).
Written Opinion of the International Searching Authority issued in PCT/CN2011/085179 mailed on Nov. 1, 2012 (4 pages).

* cited by examiner

*Primary Examiner* — Tan V. Mai
(74) *Attorney, Agent, or Firm* — Osha Liang LLP

(57) ABSTRACT

A multi-granularity parallel FFT computation device including three memories, a butterfly computation device, a state control unit, a data reversing network and a first selector. The three memories are each a multi-granularity parallel memory, and store butterfly group data and twiddle factors corresponding to the butterfly group data. The butterfly computation device perform computations of a butterfly group based on the butterfly group data outputted from the first selector and the corresponding twiddle factors outputted from one of the memories, and write a computation result back to the other two memories. The device can read butterfly group data and corresponding twiddle factors in parallel from the multi-granularity parallel memories with a specific R/W granularity. No memory conflict will occur in the read operation, and no additional process is required for sorting the read/written data.

10 Claims, 6 Drawing Sheets

MULTI-GRANULARITY PARALLEL FFT COMPUTATION DEVICE

CROSS-REFERENCE TO RELATED APPLICATIONS

This is a national stage application based on PCT/CN2011/085179, filed on Dec. 31, 2011. This application claims the priority from the same, and hereby incorporates the same by reference in its entirety.

TECHNICAL FIELD

The present application relates to parallel storage, read/write and computation of Fast Fourier Transform (FFT) data in Integrated Circuit (IC) designs.

BACKGROUND

Signal processing systems are typically required to convert signals between time and frequency domains. The Fast Fourier Transform (FFT) algorithm enables such signal conversion between time and frequency domains. Compared with other transform algorithms, FFT has advantages of uniform structure and less computation, and thus has been widely used in signal processing systems.

FFT takes N points of data as input and outputs N points of data. In general, a transform from time to frequency domain is called forward transform, while a transform from frequency to time domain is called inverse transform. There are many approaches for implementing FFT, and they are all evolved from the Cooley-Tukey algorithm. The radix-2 Cooley-Tukey algorithm has $\log_2 N$ computation stages for N data points. Each computation stage takes N data points and outputs N data points. The output from the previous stage is sorted in certain manner and used as input to the next stage. The input to the first stage is original data, and the output from the last stage is the result of FFT computation. FIG. 1 shows a computation flow including three computation stages 103 (S0, S1, S2) by assuming that the length of the data points is 8.

Each computation stage 103 is formed by N/2 butterflies (102), of which the computation flow is shown in FIG. 2. Each butterfly takes two data points A and B and a twiddle factor W as input, and obtains two results A+BW and A−BW. In the computation of each butterfly, the indices of the input data A and B has a correspondence which is determined by the computation stage of the butterfly, and the index of the input data A or B. Meanwhile, the value of the twiddle factor W is determined by the computation stage 103 of the current butterfly, the index of the input data A or B, and the FFT data length. For example, in the computation stage S0 of FIG. 1, the first data and the zeroth data form a butterfly, the zeroth data is the input A to the butterfly, and the first data is the input B to the butterfly. The value of W is 1. In the computation stage S1, the first data and the third data form a butterfly, the first data is the input A of the butterfly, the third data is the input B of the butterfly, and the value of W is 1.

The computation stages are data-dependent, and the next stage can only start its computation until the computation of the previous stage is completed. Accordingly, after completing the computation, each stage stores the results in a memory, and the next stage reads from the memory the computation results of the previous stage as input. The butterflies in a computation stage are independent of each other, and the order of the butterfly's computation does not affect the results. However, the data A, B and the twiddle factor W read out by each butterfly must satisfy certain internal correspondence.

Most patent documents relating to parallel FFT algorithms focus on how to decompose a long sequence of FFT data into a plurality of short sequences of FFT data, use a plurality of processors to compute the respective short sequences of FFT data in parallel, and then interleave the short sequences of FFT results to obtain a final long sequence of FFT result. An example is U.S. Pat. No. 6,792,441B2 ("Parallel MultiProcessing For Fast Fourier Transform With Pipeline Architecture"). Such algorithms do not consider possible conflict when the plurality of processors access the memory at the same time, or how the processors interleave the short sequences of FFT results. In to practical applications, the conflict in memory access and synchronization and communication efficiency among the processors will greatly affect FFT computation efficiency.

The U.S. Pat. No. 6,304,887B1 ("FFT-Based Parallel System For Array Processing With Low Latency") discusses parallel read/write of data in FFT. According to the patent document, the FFT data are stored in a plurality of memories, and sorted by using multiple data buffers and multiple selectors, in order to guarantee that for each R/W operation, data are distributed in a different memory. In this way, it is possible to achieve parallel read/write of data. In the patent document, dedicated memories, data buffers and selectors are required, and calculation of R/W addresses is complex. Thus, it is difficult to implement parallel FFT computation with different data lengths and R/W granularities.

SUMMARY

Technical Problem to be Solved

The present disclosure is made to support FFT computation with different data lengths and R/W granularities, and improve efficiency of FFT computation devices.

Technical Solution

The present disclosure provides a multi-granularity parallel FFT computation device comprising a first memory, a second memory, a third memory, a butterfly computation device, a state control unit, a data reversing network and a first selector. The first and second memories are configured to store butterfly group data. The third memory is configured to store twiddle factors corresponding to the butterfly group data. The butterfly computation device has input terminals connected to output terminals of the third memory and the first selector, and is configured to perform computation of a butterfly group based on the butterfly group data outputted from the first selector and the corresponding twiddle factors outputted from the third memory, and write a computation result back to the first or second memory. The state control unit is configured to generate read/write (R/W) addresses and R/W control signals for the first, second and third memories based on current computation node and stage. The data reversing network is configured to reversely arrange data within a butterfly group. The first selector is configured to receive initial input data and bit-reversed data from the data reversing network at two input terminals, respectively, and select the bit-reversed data if the current computation node is computation node 0, otherwise select the initial data.

Each of the first, second and third memories is a multi-granularity parallel memory, and connected to the state control unit so as to be accessed under control of the state control unit.

The state control unit is configured to generate the read/write (R/W) addresses and the R/W control signals for the first, second and third memories based on current computation node and stage.

The state control unit comprises first, second and third calculators configured to calculate a current computation node number s, a current logic Bank number i and a current memory row number j, respectively.

The state control unit further comprises first, second and third address generation units configured to generate a twiddle factor read address, a data write address and a data read address, respectively.

The first address generation unit is configured to generate the twiddle factor read address based on the current computation node number s, the current logic Bank number i and the current memory row number j generated respectively by the first, second and third calculators, and output the address to the third memory.

The second address generation unit is configured to generate the data write address based on the current logic Bank number i and the current memory row number j generated respectively by the second and third calculators, and output the address to an address distributor.

The state control unit further comprises a second selector and an address distributor.

The third address generation unit is configured to generate the data read address based on the current logic Bank number i and the current memory row number j generated respectively by the second and third calculators, and output the address to an address reversing logic and the second selector.

The second selector is configured to receive at its input terminals an initial read address and a bit-reversed read address, and select one of the addresses based on the current computation node number s to be outputted to the address distributor.

If the current computation node number is 0, the second selector selects the bit-reversed read address, otherwise, the second selector selects the initial read address.

The address distributor is configured to determine whether to output the read address to the first or second memory and whether to output the write address to the first or second memory, based on the current computation node number s.

Technical Effects

The multi-granularity parallel FFT computation device of the present disclosure supports data input and output in a natural order, and multi-stage computation with one read/write operation, and thus can significantly reduce the frequency of memory access and chip power consumption. The present disclosure can also specify parallel granularity as desired. The present disclosure can read butterfly group data and corresponding twiddle factors in parallel from the multi-granularity parallel memories with a specific R/W granularity. No memory conflict will occur in the read operation, and no additional process is required for sorting the read/written data. Meanwhile, it is possible to implement the bit-reversing operation at the same of the read operation. Thus, the initial data can be stored in the memories in a natural order.

DETAILED DESCRIPTION OF THE EMBODIMENTS

In the following, the present disclosure will be further explained with reference to the figures and specific embodiments so that the objects, solutions and advantages of the present disclosure become more apparent.

For a clear description, the overall structure of the multi-granularity parallel FFT computation device according to the present disclosure will be first illustrated, and then components of the device will be explained.

Figure 1:
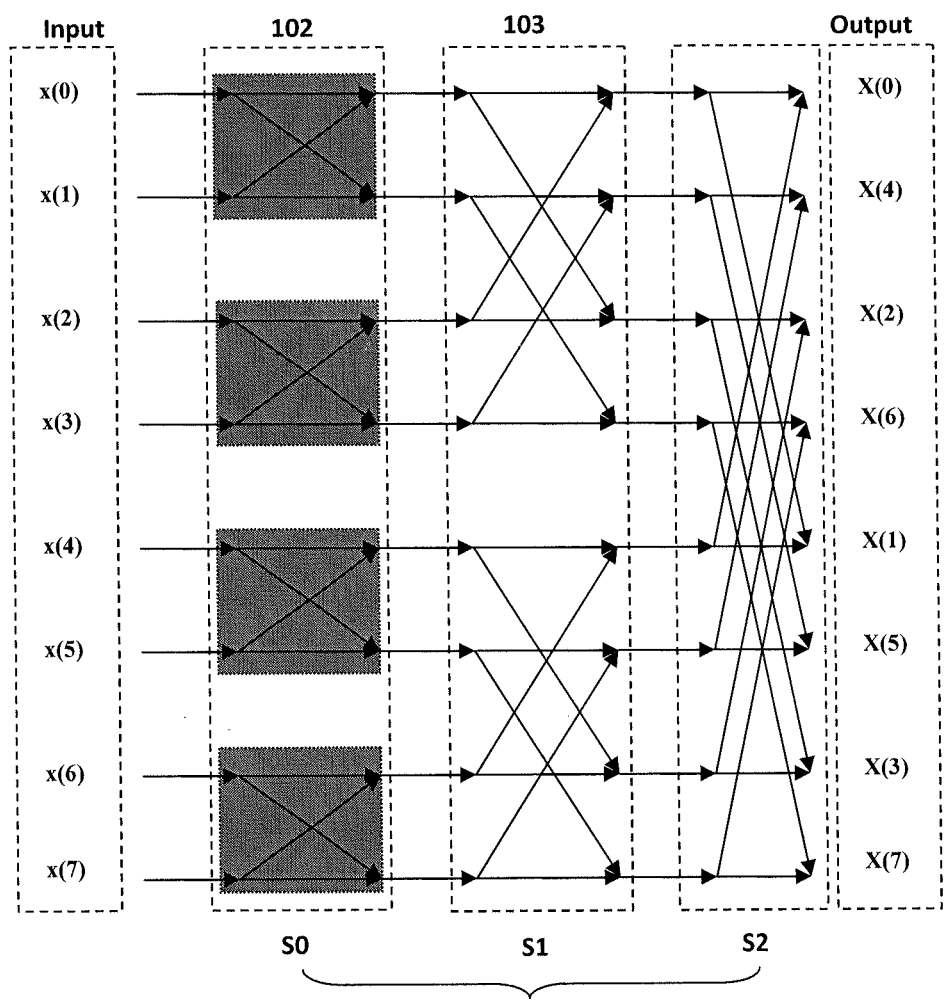
FIG. 1 is a flowchart of a radix-2 FFT algorithm with temporal decimation when the data length is 8.
Figure 2:
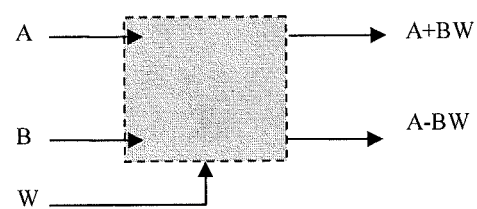
FIG. 2 is a schematic diagram of a basic butterfly.
Figure 3:
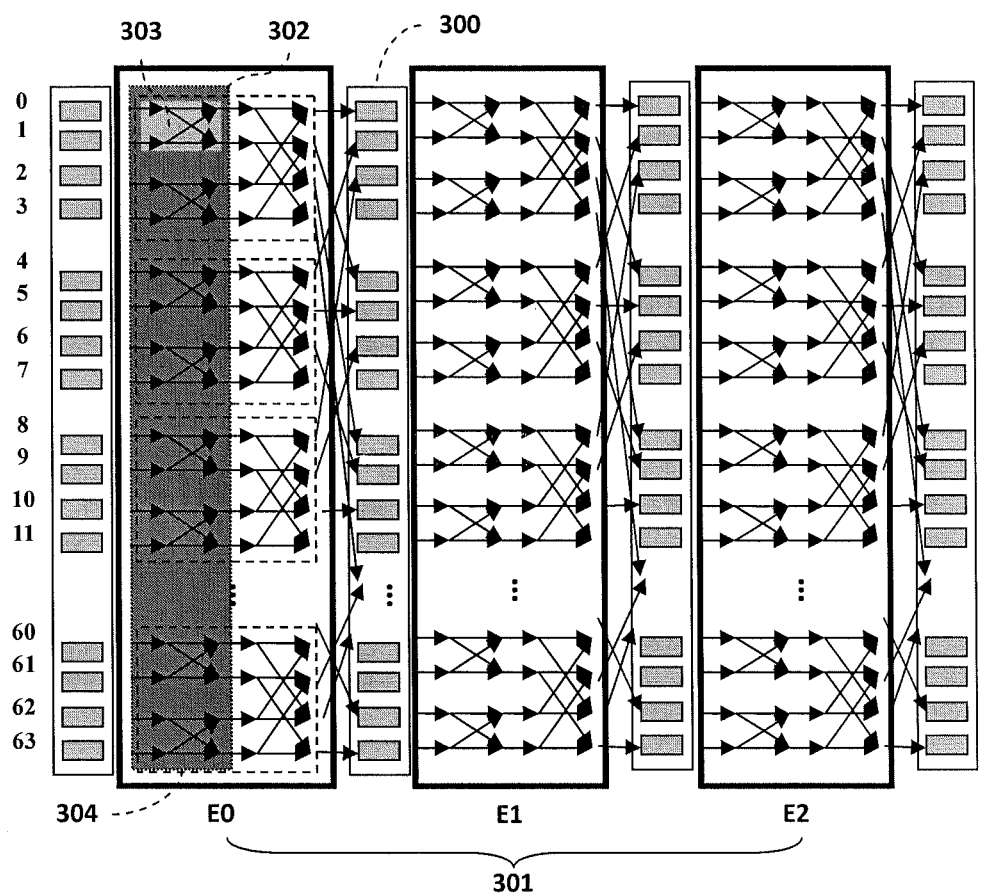
FIG. 3 is a schematic diagram showing a butterfly, a butterfly group, a computation stage and a computation node for butterfly computation.

In parallel FFT computation, a computation module reads data and respective twiddle factors for multiple butterflies from a multi-granularity parallel memory, performs a plurality of multi-stage butterfly computations in parallel, and then writes computation results in parallel into the memory for use in the next stage, as shown in FIG. 3.

In FIG. 3, assuming that the data length is 64, and parallel granularity is 4, that is, the multi-granularity parallel memory 300 support accessing 4 pieces of data each time. Meanwhile, 4 data-dependent butterflies 303 in two adjacent stages form a butterfly group 302, and the butterfly groups in the two adjacent stages form a computation node 301. In the butterfly group 302, the input A, B and W to each butterfly must satisfy the internal correspondence. Therefore, in the parallel FFT computation, consideration must be made as to the distribution of data and twiddle factors in the memory, and read/write (R/W) addresses and R/W schemes for each butterfly group 302, in order to guarantee that the butterfly computation module can always read desired data and twiddle factors in parallel.

Multi-Granularity Parallel FFT Computation Device

Figure 4:
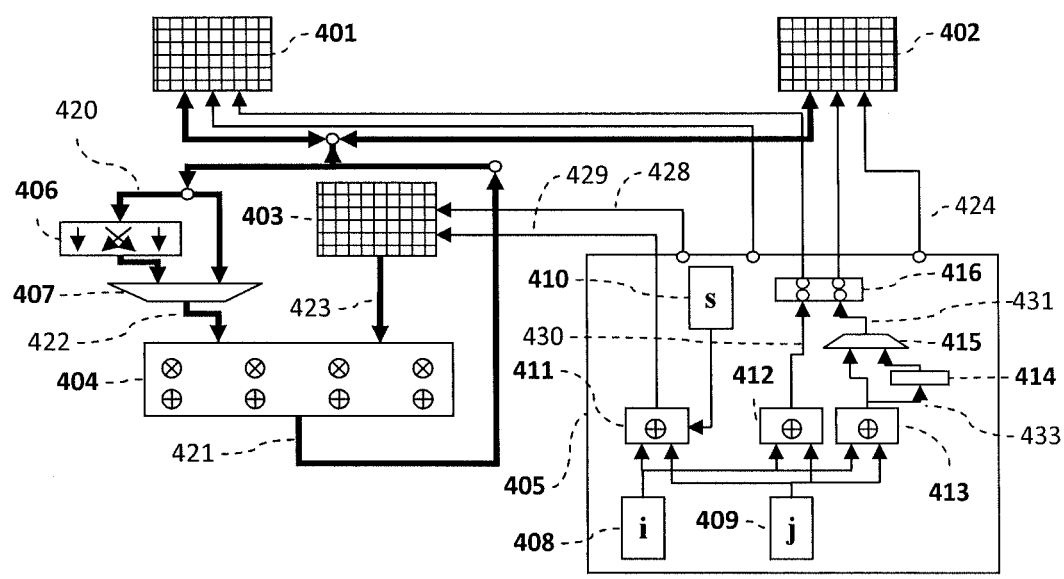
FIG. 4 is a schematic block diagram of a multi-granularity parallel FFT computation device according to an embodiment of the present disclosure.

FIG. 4 is a schematic block diagram of a multi-granularity parallel FFT computation device according to an embodiment of the present disclosure. The device includes three multi-granularity parallel memories, a butterfly computation device 404, a state control unit 405, a data reversing network 406 and a first selector 407. Here, the three multi-granularity parallel memories are referred to as a first memory 401, a second memory 402, and a third memory 403.

The first and second memories 401, 402 are configured to store butterfly group data. The third memory 403 is configured to store twiddle factors corresponding to the butterfly group data. Each of the first, second and third memories 401-403 is connected to the state control unit 405 so as to be accessed under control of the state control unit 405.

The data reversing network 406 can arrange a natural order of data in a bit-reversed manner. The data reversing network 406 is configured to reversely arrange data within a butterfly group. When the multi-granularity parallel FFT computation device has a parallel granularity of $2^n$, the data reversing network 406 has a number $2^n$ of input data on its read data line 420, and also a number $2^n$ of output data at its output terminal. Let a vector of input data is X with an index i ($0 \le i < n$), and X[i] denotes the ith input data; a vector of output data is Y with an index j ($0 \le j < n$), and Y[j] denotes the jth output data; and br(i) represents a mirror bit reversal of i. Correspondence between X and Y in the data reversing network 406 is:

$$Y[i]=X[br(i)]$$

The first selector 407 is configured to receive initial input data and bit-reversed data from the data reversing network 406 at two input terminals, respectively, and select the bit-reversed data if the current computation node is computation node 0, otherwise select the initial data.

The butterfly computation device 404 is a multi-granularity parallel FFT butterfly computation device. The butterfly computation device 404 has input terminals connected to output terminals of the third memory 403 and the first selector 407, and is configured to perform computation of a butterfly group based on the butterfly group data 422 outputted from the first selector 407 and the corresponding twiddle factors 423 outputted from the third memory 403, and write a computation result back to the first or second memory 401, 402. Specifically, if data is read from the first memory 401 for computation, the result will be written into the second memory 402. If data is read from the second memory 402 for computation, the result will be written into the first memory 401.

The state control unit 405 is configured to generate R/W addresses and R/W control signals for the first, second and third memories 401-403 based on current computation node and stage. Specifically, the output of the state control unit includes an R/W address for the first memory 401, an R/W address 425 for the second memory 402, an R/W address 429 for the third memory 403, an R/W granularity for the first memory 401, an R/W granularity 424 for the second memory 402, and an R/W granularity 428 for the third memory 403.

The state control unit 405 includes three calculators 408-410 configured to calculate a current computation node number s, a current logic Bank number i and a current memory row number j, respectively. Here, the three calculators are referred to as first, second and third calculators 408, 409, 410.

The state control unit 405 further includes three address generation units, an address reversing logic 414, a second selector 415 and an address distributor 416. The three address generation units are configured to generate a twiddle factor read address, a data write address and a data read address, respectively. Here, the three address generation units are referred to as first, second and third address generation units 411, 412, 413.

The first address generation unit 411 is configured to generate the twiddle factor read address 429 based on the current computation node number s, the current logic Bank number i and the current memory row number j generated respectively by the first, second and third calculators 408-410, and output the address to the third memory 403.

The second address generation unit, 412 is configured to generate the data write address 430 based on the current logic Bank number i and the current memory row number j generated respectively by the second and third calculators 409, 410, and output the address to the address distributor 416.

The third address generation unit 413 is configured to generate the data read address 430 based on the current logic Bank number i and the current memory row number j generated respectively by the second and third calculators 409, 410, and output the address to the address reversing logic 414 and the second selector 415.

The address reversing logic 414 is configured to receive an input from the third address generation unit 413, and perform mirror bit-reversal on the input read address.

The second selector 415 is configured to receive at its input terminals an initial read address 433 and a bit-reversed read address, and select one of the addresses based on the current computation node number s to be outputted to the address distributor 416. More particular, if the current computation node number is 0, the second selector 415 selects the bit-reversed read address, otherwise, the second selector 415 selects the initial read address. The second selector 415 outputs the selected read address 431 to the address distributor 416.

The address distributor 416 is configured to determine whether to output the read address 431 to the first or second memory 401, 402 and whether to output the write address 430 to the first or second memory 401, 402, based on the current computation node number s. Assume that the initial data in a natural order is stored in the first memory 401. If the current computation node number s is even, the address distributor 416 outputs the read address 431 to the second memory 402, and the write address 430 to the first memory 401; and if the current computation node number s is odd, the address distributor 416 outputs the read address 431 to the first memory 401, and the write address 430 to the second memory 402.

Multi-Granularity Parallel Memory

The first memory 401, the second memory 402, and the third memory 403 are each a multi-granularity parallel memory as described above. Hereafter, the multi-granularity parallel memory according to the present disclosure will be specifically described with reference to FIGS. 5 and 6.

To facilitate description of the present disclosure, the bit width of each type of data is measured by using a memory unit as reference. The memory unit is defined as the addressing unit of the memory, that is, the minimal data bit width by which a R/W operation can be performed in the memory. In the description, phrases including "bit width of W" should be construed as bits of W memory units. If the memory unit is of an 8 bit byte, the actual bit width of the memory having a 4-bit-width R/W port is 4×8=32 bits. Further, all objects are numbered from 0 in a left-to-right manner. The term "granularity" represents the number of memory units having consecutive addresses. Hereafter, symbols are defined as follows:

W: the bit width of the memory R/W port; it must be a power of 2 (i.e., W is the nth power of 2, and n is a natural number);

K: $K=\log_2 W$, and K+1 represents a kind of R/W granularity supported by the memory;

k: a parameter of memory R/W granularity; it is a natural number, and $0 \le k \le K$; an actual R/W granularity is denoted as $g=2^k$;

g: $g=2^k$, denoting the memory R/W granularity, $1 \le g \le W$;

N: the size of a memory block.

Although it is assumed in the figures of the present disclosure that W=4, the present disclosure is also applicable when W is some other power of 2.

Figure 5:
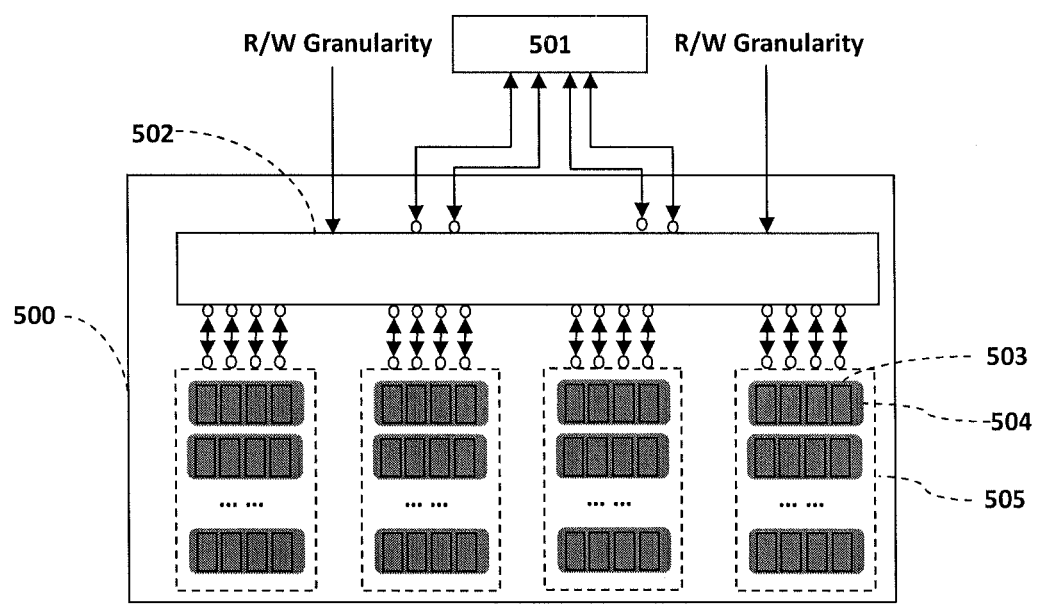
FIG. 5 is a schematic diagram showing a logic structure of a multi-granularity parallel memory according to the present disclosure.

As shown in FIG. 5, the multi-granularity parallel memory includes W memory blocks 505, and a data gating network 502. Each of the memory blocks 505 is a 2-dimension (2D) array consisting of memory units 503, and each row 504 of the 2D array must include W memory units 503. For each memory block, one row 504 can be read/written at a time.

The data gating network 502 selects logically, from the W memory blocks 505, W memory units 503 as R/W targets according to the R/W address and the R/W granularity.

The memory of the present disclosure supports multiple R/W granularities. With different R/W granularities, the start address of each memory block 505 changes. The parameter k denotes different R/W granularities, and the actual R/W granularity is $g=2^k$.

Figure 6:
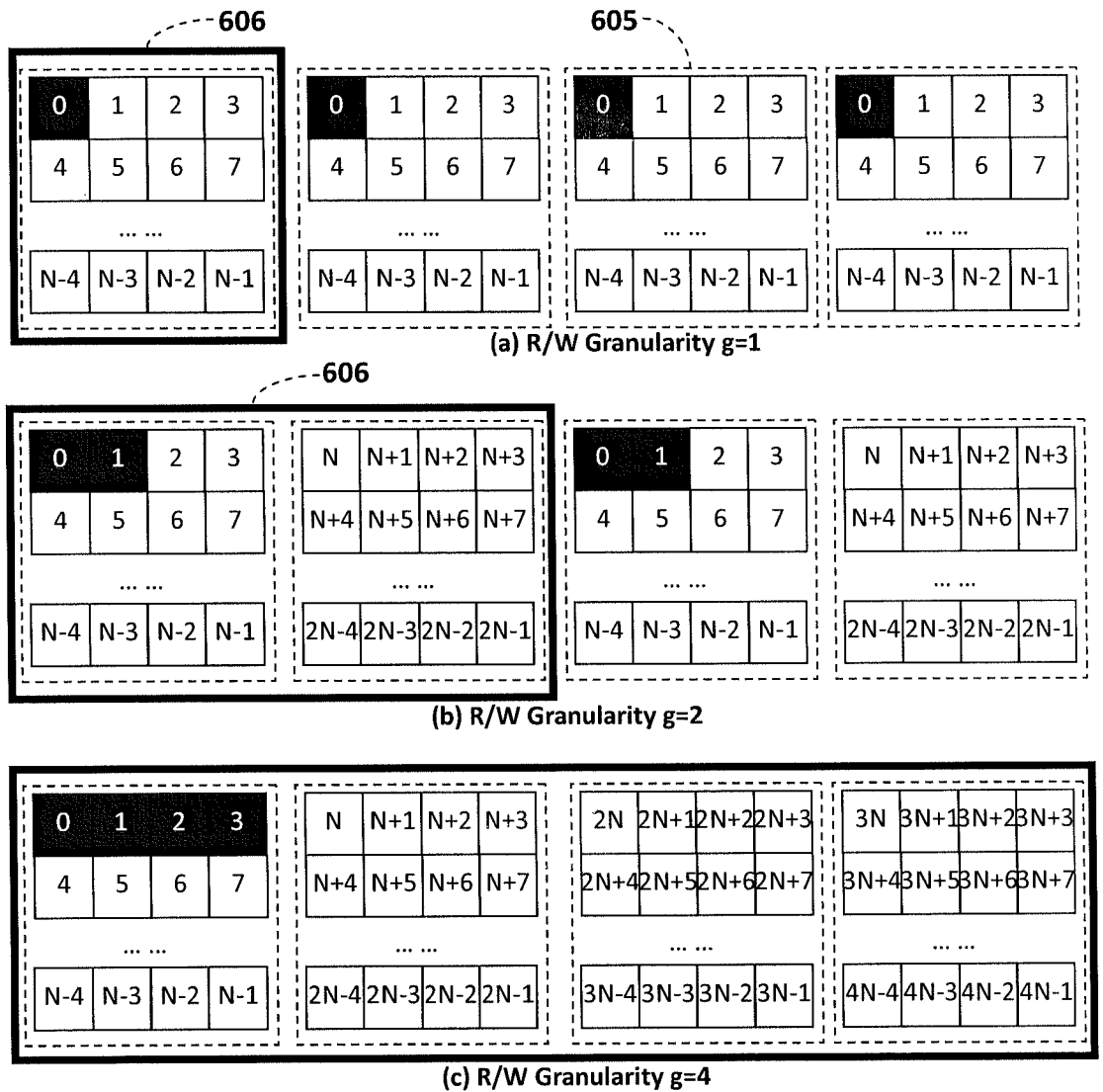
FIG. 6 is a schematic diagram showing addressing schemes and logic Bank divisions with different R/W granularities in a multi-granularity parallel memory according to the present disclosure.

FIG. 6 shows the addressing configurations of each memory block 605 of the memory in different R/W granularities when W=4. For the R/W granularity g, every g adjacent memory blocks 605 are concatenated into a logic Bank 606. All the logic Banks 606 have the same start address. The start addresses of the memory blocks in each logic Bank 606 are consecutive. The addressing range of each logic Bank 606 is 0~gN−1, and the addressing range of the entire memory is 0~gN−1.

In a read operation, the memory transmits a R/W address and a R/W granularity to each logic Bank 606. Each logic Bank 606 reads and transfers g memory units to the memory R/W port 501 via the data gating network 502. Data read from W/g logic Banks 606 are concatenated from left to right into output data of a bit width W.

In a write operation, the memory divides data transferred from the memory R/W port 501 into W/g portions, each portion of data having a bit width of g. The memory transmits the ith portion of data to the ith logic Bank 606 (0<i<W/g), and at the same time transmits a R/W address and a R/W granularity to each logic Bank 606. Each logic Bank 606 writes g memory units.

Butterfly Computation Device

The butterfly computation device 404 included in the multi-granularity parallel FFT computation device is a multi-granularity parallel FFT butterfly computation device as described above. Hereafter, the butterfly computation device will be specifically described with reference to FIG. 7.

Parallel granularity $2^L$ (L is a positive integer): parallel granularity refers to the number of data which can be read in parallel from a buffer and used independently in butterfly computation, L is parallel granularity factor.

Start computation stage Rq in a butterfly group: it denotes a computation stage from which computation in a current butterfly group starts. When N-point FFT is a balanced group, i.e., $N=L^k$, k is a positive integer, there are L stages of butterflies in each butterfly group, and Rq is always set to 0. When N-point FFT is an unbalanced group, i.e., $N \neq L^k$, the butterfly group in the last computation node does not need L stages of butterflies, and Rq is set to 1~(L−1) according to the value of N. That is, computation starts from the Rqth butterfly stage, and it indicates that the computation of the current FFT butterfly group requires L−Rq stages of butterfly computation.

The results of a basic FFT butterfly computation are referred to as A±B*W, where A and B indicate first and second data for the FFT butterfly computation, respectively, and W indicates the twiddle factor.

Figure 7:
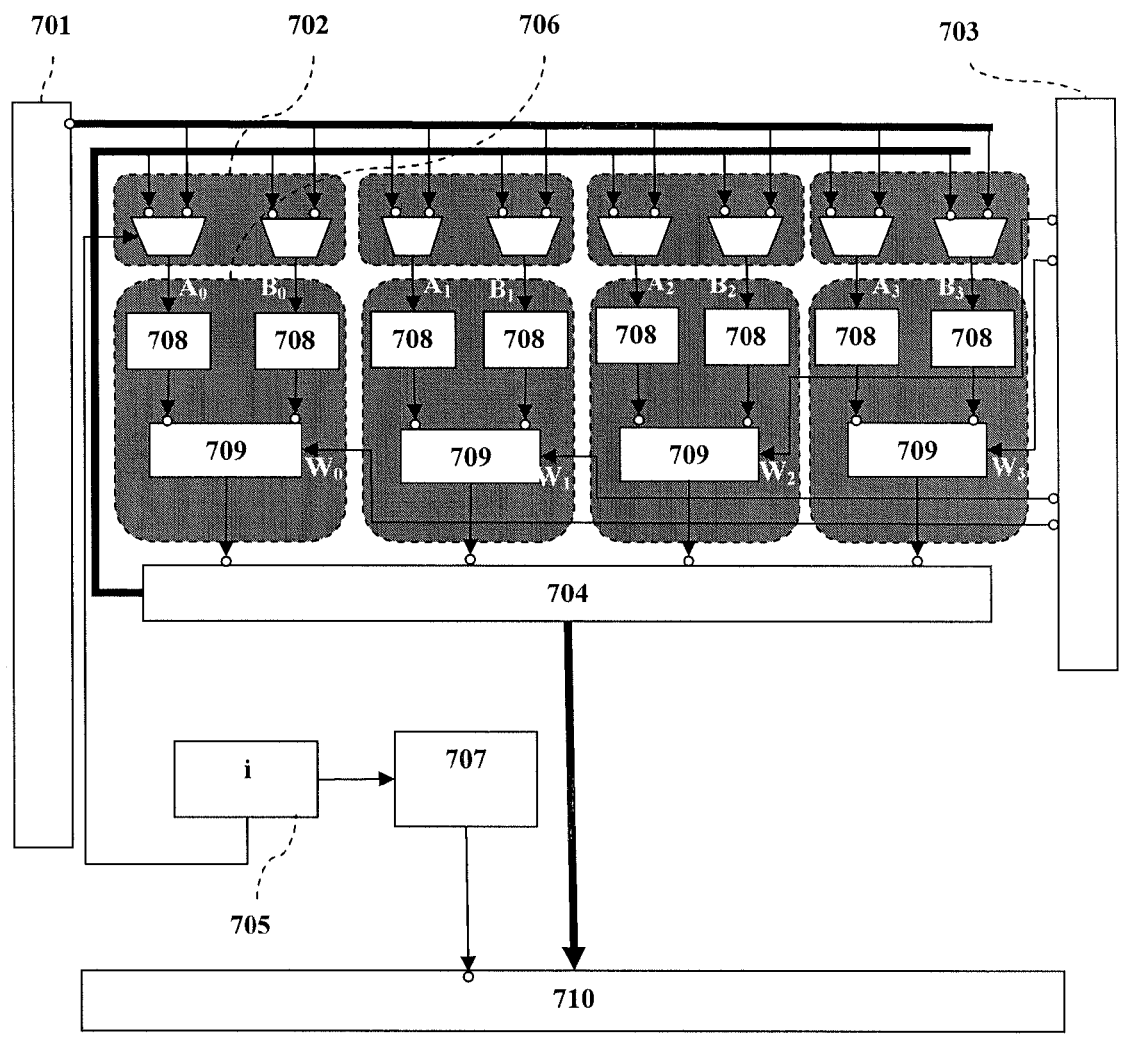
FIG. 7 is a schematic block diagram of a multi-granularity parallel FFT butterfly computation device according to the present disclosure.

As shown in FIG. 7, the butterfly computation device according to the present disclosure includes a data input buffer 701, a twiddle factor buffer 703, a data rearrangement buffer 704, a counter 705, four data gating modules 702, four butterfly computation modules 706, a writeback control module 707, and a data output buffer 710. Each of the data gating modules 702 and a corresponding one of the butterfly computation modules 706 are combined for processing one group of the input data.

The data input buffer 701 is configured to buffer data for starting the computation of a butterfly group.

The twiddle factor buffer 703 is configured to buffer twiddle factors for the butterfly computation stages in the butterfly group.

The counter 705 is configured to identify the number of stages of butterfly computation. The counter is a countdown counter having an initial value L−Rq. The value of the counter is decremented by 1 when one of the butterfly computation stages is completed.

The data gating modules 702 are configured to select whether data are to be read from the data input buffer 701 or the data rearrangement buffer 704 based on the value of the counter 705. That is, a gating signal for the data gating modules 702 is derived from the counter 705. If the value of the counter 705 is L−Rq, the data gating modules 702 select to transfer 8-point data from the data input buffer 601 into the butterfly computation module 706. Otherwise, 8-point data is read from the data rearrangement buffer 704. Each data gating module 702 takes 2 points of data as input.

Each of the butterfly computation modules 706 is configured to perform butterfly computation on the input data. Each butterfly computation module further includes a data decomposing unit 708 and a butterfly computation unit 709.

The data decomposing unit 708 is configured to decompose data for butterfly computation into a real part and an imaginary part.

The butterfly computation unit 709 is configured to perform multi-stage butterfly computation on the decomposed data. The twiddle factors required for the butterfly computation is obtained from the twiddle factor buffer 703. The results of each stage of butterfly computation are written into the data rearrangement buffer 704.

The data rearrangement buffer 704 is configured to buffer the results of the current stage of butterfly computation, and rearrange the results in an order suitable for reading into next stage of butterfly computation.

The writeback control module 707 is configured to control whether to write the data in the data rearrangement buffer 704 into the data output buffer 710. The control signal is derived from the counter 705. When the value of the counter 705 is 0, which indicates that the respective stages of parallel computation in the current butterfly group have been completed, the data in the data rearrangement buffer 704 should be written into the data output buffer 710, and the results of computation in the current butterfly group are outputted.

The foregoing description of the embodiments illustrates the objects, solutions and advantages of the present disclosure. It will be appreciated that the foregoing description refers to specific embodiments of the present disclosure, and should not be construed as limiting the present disclosure. Any changes, substitutions, modifications and the like within the spirit and principle of the present disclosure shall fall into the scope of the present disclosure.

What is claimed is:

1. A multi-granularity parallel FFT computation device comprising:

a first memory and a second memory configured to store butterfly group data;

a third memory configured to store twiddle factors corresponding to the butterfly group data;

a first selector;

a butterfly computation device has input terminals connected to output terminals of the third memory and the first selector, and is configured to perform computation of a butterfly group based on the butterfly group data outputted from the first selector and the corresponding twiddle factors outputted from the third memory, and write a computation result back to the first or second memory;

a state control unit configured to generate read/write(R/W) addresses and R/W control signals for the first, second and third memories based on current computation node and stage;

a data reversing network configured to reversely arrange data within a butterfly group;

the first selector configured to receive initial input data and bit-reversed data from the data reversing network at two input terminals, respectively, and select the bit-reversed data if the current computation node is computation node 0, otherwise select the initial data.

2. The multi-granularity parallel FFT computation device of claim 1, wherein each of the first, second and third memories is a multi-granularity parallel memory, and connected to the state control unit so as to be accessed under control of the state control unit.

3. The multi-granularity parallel FFT computation device of claim 2, wherein the state control unit is further configured to generate the read/write(R/W) addresses and the R/W control signals for the first, second and third memories based on current computation node and stage.

4. The multi-granularity parallel FFT computation device of claim 3, wherein the state control unit comprises first, second and third calculators configured to calculate a current computation node number s, a current logic Bank number i and a current memory row number j, respectively.

5. The multi-granularity parallel FFT computation device of claim 4, wherein the state control unit further comprises first, second and third address generation units configured to generate a twiddle factor read address, a data write address and a data read address, respectively.

6. The multi-granularity parallel FFT computation device of claim 5, wherein the first address generation unit is further configured to generate the twiddle factor read address based on the current computation node number s, the current logic Bank number i and the current memory row number j generated respectively by the first, second and third calculators, and output the address to the third memory.

7. The multi-granularity parallel FFT computation device of claim 5, wherein the second address generation unit is further configured to generate the data write address based on the current logic Bank number i and the current memory row number j generated respectively by the second and third calculators, and output the address to an address distributor.

8. The multi-granularity parallel FFT computation device of claim 5, wherein the state control unit further comprises a second selector and an address distributor;

the third address generation unit is configured to generate the data read address based on the current logic Bank number i and the current memory row number j generated respectively by the second and third calculators, and output the address to an address reversing logic and the second selector; and the second selector is configured to receive at its input terminals an initial read address and a bit-reversed read address, and select one of the addresses based on the current computation node number s to be outputted to the address distributor.

9. The multi-granularity parallel FFT computation device of claim 8, wherein if the current computation node number is 0, the second selector selects the bit-reversed read address, otherwise, the second selector selects the initial read address.

10. The multi-granularity parallel FFT computation device of claim 9, wherein the address distributor is configured to determine whether to output the read address to the first or second memory and whether to output the write address to the first or second memory, based on the current computation node number s.

* * * * *